US009309156B2

(12) United States Patent
Hutzler et al.

(10) Patent No.: US 9,309,156 B2
(45) Date of Patent: Apr. 12, 2016

(54) TRANSPARENT SPINEL CERAMICS AND METHOD FOR THE PRODUCTION THEREOF

(71) Applicant: FRAUNHOFER-GESELLSCHAFT ZUR FOERDERUNG DER ANGEWANDTEN FORSCHUNG E.V., Munich (DE)

(72) Inventors: Thomas Hutzler, Dresden (DE); Andreas Krell, Dresden (DE)

(73) Assignee: FRAUNHOFER-GESELLSCHAFT ZUR FOERDERUNG DER ANGEWANDTEN FORSCHUNG E.V., Munich (DE)

( * ) Notice: Subject to any disclaimer, the term of this patent is extended or adjusted under 35 U.S.C. 154(b) by 3 days.

(21) Appl. No.: 14/287,776

(22) Filed: May 27, 2014

(65) Prior Publication Data

US 2015/0344372 A1   Dec. 3, 2015

(51) Int. Cl.
*C04B 35/03* (2006.01)
*C04B 35/443* (2006.01)

(52) U.S. Cl.
CPC ....... *C04B 35/443* (2013.01); *C04B 2235/3208* (2013.01); *C04B 2235/3213* (2013.01); *C04B 2235/3215* (2013.01); *C04B 2235/785* (2013.01); *C04B 2235/786* (2013.01); *C04B 2235/963* (2013.01)

(58) Field of Classification Search
CPC .............................. C04B 35/44; C04B 35/443
USPC ........................................................ 501/120
See application file for complete search history.

(56) References Cited

U.S. PATENT DOCUMENTS

| 4,029,755 | A | * | 6/1977 | Gazza et al. | 423/600 |
| 4,543,346 | A | * | 9/1985 | Matsui et al. | 501/120 |
| 5,611,959 | A | | 3/1997 | Kijima et al. | |
| 7,247,589 | B2 | | 7/2007 | Krell et al. | |
| 7,799,267 | B2 | | 9/2010 | Messing et al. | |
| 2009/0108507 | A1 | * | 4/2009 | Messing et al. | 264/605 |
| 2010/0111803 | A1 | * | 5/2010 | Brun et al. | 423/331 |
| 2011/0028303 | A1 | | 2/2011 | Villalobos et al. | |

FOREIGN PATENT DOCUMENTS

| DE | 102012220257 | 5/2013 |
| EP | 0332393 | 9/1989 |
| EP | 0334760 B1 | 5/1993 |
| EP | 1053983 | 11/2000 |
| EP | 1873129 | 1/2008 |
| EP | 2112127 | 10/2009 |
| FR | 2917404 | 12/2008 |

OTHER PUBLICATIONS

Bratton. Translucent Sintered MgAl2O4. Journal of the American Ceramic Society. vol. 57, No. 7. Jul. 1974. pp. 283-286.*
Jow-Lay Huang et al., "Investigation of High-Alumina Spinel: Effect of LiF and CaCO3 Addition", J. Am. Ceram. Soc., 1997, pp. 3237-3241.
R.J. Bratton, "Translucent Sintered $MgAl_2O_4$", Journal of the American Ceramic Society, Jul. 1974, pp. 293-296.
Jan Gerard Jacob Peelen, "Alumina: Sintering and Optical Properties", Dissertation, 1977, pp. 1-111.
Wen-Chou Tsai et al., "Microwave dielectric properties of $MgAl_2O_4$—$CoAl_2O_4$ spinel compounds prepared by reaction-sintering process", Materials Science and Engineering B, 2012, pp. 1133-1137.
Juyoung Kim, "Effect of $ZrO_2$ Addition and Nonstoichiometry on Sintering and Physical Property of Magnesium Aluminate Spinel", Dissertation extract, Jan. 1992, pp. 1-15.
Gary Gilde et al., "Evaluation of Hot Pressing and Hot Isostatic Pressing Parameters on the Optical Properties of Spinel", J. Am. Ceram. Soc., 2005, pp. 2747-2751.
Ritwik Sarkar et al., "Effect of additives on the desification of reaction sintered and presynthesised spinels", Ceramics International, 2003, pp. 55-59.
Jie Zhang et al., "Related mechanism of transparency in $MgAl_2O_4$ nano-ceramics prepared by sintering under high pressure and low temperature", J. Phys. D: Appl. Phys. 42, 2009, pp. 1-5.
Rolf Apetz et al., "Transparent Alumina: A Light-Scattering Model", J. Am. Ceram. Soc., Mar. 2003, pp. 480-486.
Koji Tsukuma, "Transparent $MgAl_2O_4$ Spinell Ceramics Produced by HIP Post-Sintering", Joural of the Ceramic Society of Japan, 2006, pp. 802-806.

* cited by examiner

*Primary Examiner* — Noah Wiese
(74) *Attorney, Agent, or Firm* — Greenblum & Bernstein, P.L.C.

(57) ABSTRACT

Transparent spinel ceramics, as they can be used, for example, as protective ceramics, and to a method for the production thereof.
Transparent spinel ceramics which preferably contain no visible defects and which have an in-line transmission of more than 82% in wavelength ranges of infrared light, measured between 1000 nm and 2500 nm, at sample thicknesses≥3 mm. Spinel ceramics transparent in wavelength ranges of infrared light which are composed of sintered magnesium aluminum spinel having an average structural grain size of ≤10 μm and having maximally 0.5 mass % overall of homogeneously distributed additives of calcium and/or strontium and/or barium which are present in a concentration, expressed respectively as an oxide, of 0.005 to <0.2 mass % CaO and/or 0.005 to <0.5 mass % SrO and/or 0.005 to <0.5 mass % BaO.

32 Claims, No Drawings

TRANSPARENT SPINEL CERAMICS AND METHOD FOR THE PRODUCTION THEREOF

The invention concerns the field of technical ceramics and relates to transparent spinel ceramics, as they can for example be used for applications with increased mechanical loading, for example, as protective ceramics, or with increased optical quality requirements, for example, for optical devices, and to a method for the production thereof.

There has long been the desire for a transparent ceramic that combines the advantageous properties of a ceramic, for example, regarding hardness and strength, with the greatest possible transparency. To date, however, this has not been achieved to the desired extent, despite lengthy and intensive efforts by the experts. In addition, due to the exceedingly different definitions of the desired criteria, the results achieved are often not comparable, so that the actual state of knowledge about transparent ceramics is at the very least disordered and unclear.

Accordingly, terms are explained and defined below as they are to apply within the scope of this invention and also in relation to the prior art cited.

The terms "transparent" and "translucent" are not clearly differentiated from one another in the prior art. Thus, transparent materials are hereinafter to be understood as such materials which exhibit an in-line transmission of more than 50% at thicknesses>1 mm and visible wavelengths around 600 nm.

For the calculation of the transparency of materials, the real in-line transmission (RIT), which is to be measured using a narrow aperture angle of approx. 0.5° for the purpose of excluding scattered light from the measured intensity, is the responsible variable, as it has been described, for example, in EP 1053983 A (Yamamoto, et al.) or by Apetz et al., J. Am. Ceram. Soc. 86 (2003) 480. The difference between RIT and the in-line transmission determined using typical spectrometers, which according to Apetz, operate with an effective aperture angle of 3-5°, is of course particularly marked at shorter wavelengths (which lead to more pronounced scattering losses), as well as over the entire visible range, whereas this measuring-related distinction does not play a role in the infrared range.

In the case of non-existent or extremely low light absorption, the transmission for optically homogeneous materials such as glass or for monocrystals is limited only by the material-specific reflection $R_s=((n-1)/(n+1))^2$, which is determined by the refractive index n, at the front side and the back side respectively. The resulting theoretical maximum value of transmission $T_{max}$ is, for highly transparent materials when taking the multiple reflection into account, $T_{max}=(1-R)$, with $R=2R_s/(1+R_s)$ or $T_{max}=(1-R_s)^2$ for materials with low transparency, that is, with negligible multiple reflection; for $MgO.Al_2O_3$ spinels, the refractive index of which lies between 1.712 and 1.736 in the visible range. $T_{max}$ is approx. 86.9%.

As a particular advantage of a very high RIT for a flexible design of the transparent products adapted to the individual applications, it should be noted that, when the theoretical maximum $T_{max}$ is approached, the thickness influence decreases, whereas conversely, potential larger scattering losses of course increase with the thickness of the light-scattering material and the transparency is then only still ensured for very thin components.

Thus, a thickness influence of this type is a criterion for the presence of considerable light scattering—that is, low transparency—and the cause of potential high transmission values by an aperture angle that is too large and which renders measurement of the real in-line transmission impossible.

Apart from potential absorption, RIT is mostly reduced with respect to $T_{max}$ by the following processes as light passes through the structure of sintered polycrystalline ceramics:
1. diffuse scattering at pores (depending on the size and number of the pores) and
2. particularly in non-cubic ceramics, such as corundum ($\alpha$-$Al_2O_3$), additional light scattering due to birefringence at each transition of the light beam from one crystallite of the structure to the next.

The scattering losses therefore must be kept small in all sintered ceramics by means of a smallest possible residual porosity of <0.1%, preferably <0.01%, and by pore sizes that are preferably smaller than the wavelength of the light.

Because only the former scattering mechanism occurs in cubic sintered ceramics, the transparency thereof is not subject to an immediate grain-size influence, unlike ceramics with birefringent (non-cubic) crystallites. This situation, which differs depending on the crystal structure, makes clear why ceramics with a cubic crystal lattice are preferred for transparent applications and why harder or stronger non-cubic ceramics, such as the sintered corundum ceramics or tetragonal $ZrO_2$ ceramics, which are only translucent at greater thicknesses, play a mere secondary role: The most advanced, that is, the finest-grained and least-porous, sintered corundums (trigonal) do not presently show an RIT>70% at thicknesses≥1 mm, wherein tetragonal $ZrO_2$ ceramics exhibit even lower transparency, whereas measured values between 80% and 85% were disclosed repeatedly, for example, for MgO—$Al_2O_3$ spinel (cubic), even at greater thicknesses and, therefore, closer to the above-mentioned theoretical maximum.

However, most cubic transparent ceramics known according to the prior art tend to show lower values for hardness, scratch-resistance and strength. Improvements in these mechanical properties are only possible by way of reduced grain size of the sintered structures. One example thereof is known according to U.S. Pat. No. 7,247,589 A (Krell, et al.), wherein developments of this type were previously limited by fine-crystalline sintered structures of this type with average grain sizes<10 µm or even <1 µm only being achievable at low production temperatures. Below certain sintering temperatures, however, this comes into conflict with the above-mentioned requirement of minimal residual porosity or of high relative sintering densities>99.9%, or preferably <99.99%, and subsequently leads to a structure which is fine-grained, but which has reduced transparency or even visible defects, often in the form of incompletely sintered partial regions of the structures.

In addition to diverse efforts at optimized (and pressure-assisted) sintering systems, as described, for example, in EP 0332393 A (Shibata et al.), there have also been attempts to solve the problem of dense-sintering transparent spinel ceramic through the use of increasingly finer nanopowders (J. Zhang et al., J. Phys. D: Appl. Phys. 42 (2009) 5, 2002-2006) or by altering the stoichiometry (EP 1873129 A, Sasame et al.). However, up to now, the optical quality has remained unsatisfactory, precisely within the range of visible light.

For this reason, special attention has been paid for some time to optimizing sinter-promoting dopings, and thereby preferably also temperature-reducing and, in this manner, grain growth-reducing dopings. The best known dopings for producing translucent spinel ceramic are the worldwide experiments with dopings which form liquid phases, using 0.25 mass % CaO in an early example (R. J. Bratton, J. Ceram. Soc. 57 (1974) 7, 283-286). The production of a translucent spinel ceramic with an in-line transmission<40% for 0.37-mm-0.95-mm thin samples in the visible range is described. Subsequent developments increased the effect of liquid-phase sintering, above all with LiF doping (US 2011/0028303 A. Villalobos et al.), which, however, typically leads to the formation of visible defects (G. Gilde et al., J. Am. Ceram. Soc. 88 (2005) 10, 2747). Presumably, these defects can be minimized as part of a liquid-phase sintering of this type, but cannot be avoided.

This is the background of increasing efforts at dopings which, preferably as part of a pure solid-phase sintering or while minimizing the occurrence of liquid phases, are to achieve for transparent spinel ceramic results similar to what the MgO doping, which has been known for years, accomplishes in the sintering of $Al_2O_3$ ceramic: on the one hand, the promotion of the diffusion, and thereby of the dense-sintering, by the atomic effect of a solid solution of parts of the doping in the lattice of the main phase of the ceramic; on the other hand also a reduction in the grain growth of the ceramic by second-phase particles in the grain borders, as described by von Peelen (J. G. J. Peelen, Dissertation, T H Eindhoven, 1977). In respect of the combination of high transparency with the finest possible granularity of the structure as a precondition for improved mechanical properties, the following examples are to be named in particular:

K. Tsukuma, J. Ceram. Soc. Japan 114 (2006) 10, 802-806 achieved a considerable reduction of the sintering temperature with a doping of 0.015-0.150 mass % $B_2O_3$, yet discloses transmission values of about 83% at a 600-650 nm wavelength for samples only 1-mm thick so that a merely limited improvement in transparency can be assumed. Although no statements are made as to the frequency and size of residual visual defects, such defects can be assumed if the reduction of the sintering temperature is based on the formation of local liquid phases which can be presumed with the $B_2O_3$ additive, similar to the case of the above-referenced LiF doping.

According to EP 2112127 A1 (A. Ikesue), very high transmission values close to the theoretical limit for 10-mm thick sintered spinel samples are known which were produced by hot isostatic pressing (HIP) at high temperature (1780° C.) with the addition of an $MgF_2/AlF_3$ co-doping. However, the actual cause of the transparency achieved is unclear: Despite years of efforts, the authors have not succeeded in reproducing the results disclosed in the patent application. In addition, no successful pursuit of this doping by other authors has become known.

According to FR 0334760 B1 (P. Bergez et al.), an additive of 0.5-5 mass % MgO is known, which is to be preferably added during the synthesis of the spinel powder and does not constitute an actual sinter doping in the above sense, as the MgO surplus is only to compensate the known effect of the vaporization of MgO from the spinel lattice at high sintering temperatures. However, numerous publications are known which achieve a similar transparency of approx. 80% at a 600-650 nm wavelength for 3-mm thick samples as per FR 0334760 B1, even without this type of MgO surplus.

A particularly wide range of doping additives for spinel has been studied by Sarkar et al., Ceram. Int. 29 (2003) 1, 55-59, albeit with no relation to transparent ceramic qualities. Additives of $TiO_2$, $V_2O_5$, $Cr_2O_3$ and $B_2O_3$ were described in terms of their effect on the reactive sintering of $MgO/Al_2O_3$ mixtures, wherein only $TiO_2$ showed a positive effect and the effect on the sintering of pre-calcinated spinel powders remains unknown. The list of literature cited in this publication also addresses $Y_2O_3$ dopings and other rare-earth dopings as well as $MnO2$, albeit also with no relation to the production of transparent ceramics.

While, on the one hand, $TiO_2$ dopings for sinter spinel were discussed time and time again, the sole effect of $TiO_2$ appears to be insufficient for satisfactory transparency. Thus, according to FR 2917404 B1 (Bernard-Granger et al.), co-dopings of $TiO_2$ with at least one additional additive that is to be selected from the group of $ZrO_2$, CaO and MgO are known. This doping is to subsequently universally improve the transparency of completely different ceramics of $MgAl_2O_4$ spinel, cubic $ZrO_2$ or Y—Al garnet ($Y_3Al_5O_{12}$). This universal efficiency could indicate the formation of a liquid phase, which would then, however, be associated with a risk of the above-mentioned disadvantages of the liquid-phase sintering of transparent ceramics. The exemplary embodiment for spinel mentions a very high in-line transmission of 84.8%, albeit for a merely 1.3-mm thin sample, so that a rather limited improvement in transparency can also be assumed here. Statements as to the frequency and size of residual visual defects are also not made here.

A similar attempt at co-doping for the improvement of dense-sintering was described by Tsai et al., Mater. Sci. Eng. B177 (2012) 13, 1133-1137, using a combination of $TiO_2$ and $CoCO_3$, albeit without a clear advantage of this doping being demonstrated.

The effect of $ZrO_2$ dopings on the reactive formation of spinel of $MgO/Al_2O_3$ mixtures and on the dense-sintering performance was—with no relation to transparency—studied by J. Kim, Ph.D. dissertation, Case Western Reserve University, 1992. According to the study, $ZrO_2$ dopings reduce the sintering rate of the spinel and promote the formation of $Al_2O_3$ precipitations in the case of Al-rich compounds. Both of these results run counter to the goal of improved in-line transmission and the minimization of visible defects.

One of the earliest doping studies for transparent spinel ceramics was carried out by R. J. Bratton, J. Am. Ceram. Soc. 57 (1974) 7, 283-286 with a 0.25% CaO addition, but was not able to obtain a transmission>40% in the visible wavelength range; the material remained translucent. Huang et al., J. Am. Ceram. Soc. 80 (1997) 12, 3237-3241 later studied the effect of $CaCO_3$ on the dense-sintering of spinel as a co-doping to LiF, albeit without the goal of transparency. The author's own attempts using ≥0.2 mass % CaO doping showed that, in this manner, the sintering temperature can be lowered and very fine-grained transparent spinel structures can be formed, albeit at the expense of a real in-line transmission RIT reduced by several percentages and associated with the formation of visible defects in the volume of the transparent ceramic. The partially dendritic structure of these defects thereby leads to the conclusion that CaO dopings of this type also achieve their temperature-reducing effect by forming local liquid phases—in conflict with the necessary single-phase condition of defect-free transparent ceramic, in which precipitations of foreign phases with a differing refractive index are only tolerated if the size thereof is small in comparison with the shorter wavelengths of the light spectrum. From the alkaline earth group of the Periodic Table of Elements, the so-called "BAM" phosphors of the $BaMgAl_{10}O_{17}$ formula are known which are typically doped with europium or strontium (U.S. Pat. No. 5,611,959 A). The existence of compounds of this type, however, says nothing about a potential effect of Ba, Sr or Eu as a sintering additive to Mg—Al spinel ceramics. And even though a transparent spinel ceramic is known according to DE 10 2012 220 257 A1 which, among other things, can contain one of the oxides of europium, barium, or combinations thereof or of 10 other elements listed without any reason, yet the required transparency is bound to a grain growth to average values of >10 μm and no methods, effects or results are stated for any of the dopings, this publication also does not disclose any teaching on producing a fine-crystalline spinel ceramic with high transparency.

U.S. Pat. No. 7,799,267 B2 also illustrates the disorientation of the developers in the search for sinter-promoting dopings, as the production of transparent spinel ceramic and also of transparent Y—Al garnet, $Ce_2O_3$, $Y_2O_3$, $SC_2O_3$ and $Lu_2O_3$ exclusively by means of a TEOS additive (tetraethyl orthosilicate, also tetraethooxysilane) are described therein for the special technology of "tape casting slurry materials for manufacture of transparent ceramic materials", but it is noted in the introduction on the one hand, without any reason, reference or demonstration of a property result, that "oxides such as but not limited to lithium oxide, titanium oxide, zirconium oxide, barium oxide, calcium oxide, magnesium oxide, strontium oxide, boron oxide and mixtures thereof", that is, effectively anything, can potentially also be used as "sintering aids"— whereas, on the other hand, this potential range of possibilities, however, stands in opposition to actually described sintering temperatures which, at 1700° C. in the spinel example (without a disclosed transparency result) and even higher temperatures for other ceramics, are discouragingly high; exclude the production of fine-crystalline structures: and, nevertheless, only enable limited transparency: 81.20%-81.27% is disclosed in U.S. Pat. No. 7,799,267 B2 as the sole transmission result for a 2.7-mm thick YAG ceramic at a 600-nm-650-nm wavelength, presumably because of the high content of organic additives necessary for the described tape casting.

Even though the literature thus describes sinter-promoting dopings for spinel ceramics from nearly all groups of the Periodic Table, no systematics is discernible as of yet for which doped ions promote the achievement of high transparency while mostly avoiding visible defects, and in which manner, and make this possible at the lowest possible sintering temperature for achieving fine-grained structures with high mechanical parameters. In addition, the literature for magnesium aluminum spinel does not include similarly extensive data, for example, on the amount of solid solubility of individual elements of the Periodic Table as a function of temperature and atmospheres, as this has been known for $Al_2O_3$ for decades.

In light of the illustrated limited previous successes of the prior art, one object of the present invention is the disclosure of transparent spinel ceramics which have no visible defects, or in the case of defects with sizes>20 μm, at most contain these defects at a low frequency<300/cm$^3$, and which have an in-line transmission of more than 82% in wavelength ranges of infrared light, measured between 1000 nm and 2500 nm, at sample thicknesses≥3 mm.

A further object of the present invention is the disclosure of transparent spinel ceramics which have no visible defects, or in the case of defects with sizes>20 μm, at most contain these defects at a low frequency<300/cm$^3$, and which have a real in-line transmission RIT>80% in wavelength ranges of visible light, measured between 600 nm and 650 nm, at sample thicknesses≥3 mm.

And a further object of the present invention is the disclosure of methods for producing transparent spinel ceramics of this type at the lowest possible sintering temperatures.

The objects are attained by the invention disclosed in the claims. Advantageous embodiments are the subject matter of the dependent claims.

The spinel ceramics according to the invention which are transparent in wavelength ranges of infrared light are composed of sintered magnesium aluminum spinel having an average structural grain size of ≤10 μm and having maximally 0.5 mass % overall of homogeneously distributed additives of calcium and/or strontium and/or barium which are present in a concentration, expressed respectively as an oxide, of 0.005 to <0.2 mass % CaO and/or 0.005 to <0.5 mass % SrO and/or 0.005 to <0.5 mass % BaO.

The spinel ceramics according to the invention which are transparent in wavelength ranges of visible light are composed of sintered magnesium aluminum spinel having an average structural grain size of ≤10 μm and having maximally 0.3 mass % overall of homogeneously distributed additives of calcium and/or strontium and/or barium which are present in a concentration, expressed respectively as an oxide, of 0.005 to <0.2 mass % CaO and/or 0.005 to <0.3 mass % SrO and/or 0.005 to <0.25 mass % BaO.

Advantageously, the average structural grain size of the sintered magnesium aluminum spinel is <5 μm, advantageously <2.5 μm, more advantageously <1 μm.

Also advantageously, maximally 0.3 mass % overall of homogeneously distributed additives are present for spinel ceramics which are transparent in wavelength ranges of infrared light.

Likewise advantageously, maximally 0.2 mass % overall of homogeneously distributed additives are present for spinel ceramics which are transparent in wavelength ranges of visible light.

Further advantageously, calcium is present as an additive in a concentration, expressed as CaO, of 0.01 to 0.1 mass %.

And, also advantageously, strontium and/or barium are present as additives in a concentration, expressed as SrO and/or BaO, of 0.01 to 0.4 mass % of SrO and/or 0.01 to 0.4 mass % of BaO for spinel ceramics which are transparent in wavelength ranges of infrared light, wherein maximally 0.3 mass % of additives of strontium and/or barium are present.

It is likewise advantageous if, for spinel ceramics which are transparent in wavelength ranges of visible light, strontium and/or barium are present as additives in a concentration, expressed as SrO and/or BaO, of 0.01 to 0.2 mass % of SrO and/or 0.01 to 0.15 mass % of BaO, wherein maximally 0.2 mass % of additives of strontium and/or barium are present.

The spinel ceramics according to the invention which are transparent in wavelength ranges of infrared light show an in-line transmission of >82%, advantageously >84%, more advantageously >85%, at least within the range of infrared wavelengths, measured between 1000 nm and 2500 nm, at thicknesses of ≥3 mm.

The spinet ceramics according to the invention which are transparent in wavelength ranges of visible light show an RIT of >80%, advantageously >82%, more advantageously >84%, at least within the range of visible wavelengths, measured between 600 nm and 650 nm, at thicknesses of ≥3 mm.

It is advantageous if the spinel ceramics according to the invention contain no visible defects.

It is likewise advantageous if the spinel ceramics according to the invention contain visible defects larger than 20 μm only at a frequency<300/cm$^3$, advantageously at a frequency of 50/cm$^3$ to 150/cm$^3$.

And it is also advantageous if HV10 Vickers hardnesses of >12.5 GPa are present.

In the method according to the invention for producing transparent spinel ceramics which are transparent in the wavelength ranges of infrared light, the addition of maximally 0.5 mass % overall of additives of calcium and/or strontium and/or barium in a concentration, expressed respectively as an oxide, of 0.005 to <0.2 mass % CaO and/or 0.005 to <0.5 mass % SrO and/or 0.005 to <0.5 mass % BaO in the form of undissolved compounds containing Ca, Sr and/or Ba and/or compounds containing Ca, Sr and/or Ba dissolved in water and/or compounds containing Ca, Sr and/or Ba dissolved in organic solvents to magnesium aluminum spinel powder is carried out, the additives are distributed homogeneously, and the materials are subsequently sintered to form a transparent spinel ceramic.

In the method according to the invention for producing transparent spinel ceramics, which are transparent in the wavelength ranges of visible light, the addition of maximally 0.3 mass % overall of additives of calcium and/or strontium and/or barium in a concentration, expressed respectively as an oxide, of 0.005 to <0.2 mass % CaO and/or 0.005 to <0.3 mass SrO and/or 0.005 to <0.25 mass % BaO in the form of undissolved compounds containing Ca, Sr and/or Ba and/or compounds containing Ca, Sr and/or Ba dissolved in water and/or compounds containing Ca, Sr and/or Ba dissolved in organic solvents to magnesium aluminum spinel powder is carried out, the additives are distributed homogeneously, and the materials are subsequently sintered to form a transparent spinel ceramic.

Advantageously, the addition of the additives is carried out during the slurry preparation or packing preparation of the ceramic, or as part of an impregnation or infiltration by the additives into open pores of a dry ceramic body, or is realized by an ion exchange between wet magnesium aluminum spinel bodies and solutions according to the invention containing Ca, Sr and/or Ba.

With the solution according to the invention, it becomes possible for the first time to disclose transparent spinel ceramics with average grain sizes≤10 μM which contain no visible defects or, in the case of defects with sizes>20 μm, at most contain these defects at a low frequency of <300/cm$^3$ and which have an in-line transmission of more than 82% in wavelength ranges of infrared light, measured between 1000 nm and 2500 nm, at sample thicknesses≥3 mm.

This is achieved by spinel ceramics transparent in wavelength ranges of infrared light which are composed of sintered magnesium aluminum spinel having an average structural grain size of ≤10 μm and having maximally 0.5 mass % overall of homogeneously distributed additives of calcium and/or strontium and/or barium which are present in a concentration, expressed respectively as an oxide, of 0.005 to <0.2 mass % CaO and/or 0.005 to <0.5 mass % SrO and/or 0.005 to <0.5 mass % BaO.

In addition, with the solution according to the invention, it becomes possible for the first time to disclose transparent spinel ceramics with average grain sizes≤10 μm which have no visible defects or, in the case of defects with sizes>20 μm, at most contain these defects at a low frequency of <300/cm$^3$ and which have a real in-line transmission rate RIT>80% in wavelength ranges of visible light, measured between 600 nm and 650 nm, at sample sizes≥3 mm.

This is achieved by spinel ceramics transparent in wavelength ranges of visible light which are composed of sintered magnesium aluminum spinel having an average structural grain size of ≤10 μm and having maximally 0.3 mass % overall of homogeneously distributed additives of calcium and/or strontium and/or barium which are present in a concentration, expressed respectively as an oxide, of 0.005 to 0.2 mass % CaO and/or 0.005 to <0.3 mass % SrO and/or 0.005 to <0.25 mass % BaO.

And, with the solution according to the invention, it also becomes possible for the first time to disclose a method for producing transparent spinel ceramics of this type at the lowest possible sintering temperatures.

This, in turn, is achieved for spinel ceramics transparent in wavelength ranges of infrared light by adding maximally 0.5 mass % overall of additives of calcium and/or strontium and/or barium in a concentration, expressed respectively as an oxide, of 0.005 to <0.2 mass CaO and/or 0.005 to <0.5 mass % SrO and/or 0.005 to <0.5 mass % BaO in the form of undissolved compounds containing Ca, Sr and/or Ba and/or compounds containing Ca, Sr and/or Ba dissolved in water and/or compounds containing Ca, Sr and/or Ba dissolved in organic solvents to magnesium aluminum spinel powder, homogeneously distributing the additives, and subsequently sintering the materials to form a transparent spinel ceramic.

For spinel ceramics transparent in wavelength ranges of visible light, the production of transparent spinel ceramics of this type at the lowest possible sintering temperatures is achieved by adding maximally 0.3 mass % overall of additives of calcium and/or strontium and/or barium in a concentration, expressed respectively as an oxide, of 0.005 to <0.2 mass % CaO and/or 0.005 to <0.3 mass % SrO and/or 0.005 to <0.25 mass % BaO in the form of undissolved compounds containing Ca, Sr and/or Ba and/or compounds containing Ca, Sr and/or Ba dissolved in water and/or compounds containing Ca, Sr and/or Ba dissolved in organic solvents to magnesium aluminum spinel powder, homogeneously distributing the additives, and subsequently sintering the materials to form a transparent spinel ceramic.

For the additives, varying upper limits of the concentrations that are to be used are present which depend on the different atomic weights so that similar molar concentrations can already be achieved using smaller mass additions of Ba, for example, than in the case of Sr or Ca.

Slightly differing upper limits of the additives to be used must also be considered if the spine) ceramics are only intended for infrared use or, furthermore, should also have a high transparency in the range of visible light.

Magnesium aluminum spinel, referred to within the scope of this invention as spinel ceramic, is also to be understood within the scope of this invention to mean any compound of the type $MgO \cdot xAl_2O_3$ with x values that lie in the homogeneity range of the known phase diagrams. Furthermore, the spinel ceramics sintered according to the invention contain additives and/or dopings and can also contain small precipitations of MgO portions or $Al_2O_3$ portions not dissolved in the spinel lattice or of impurities dissolved in the spinel lattice or undissolved impurities, provided that the content thereof is low enough that the light scattering caused thereby or absorption does not inhibit the transparency that is to be achieved according to the invention.

Within the scope of this invention, sintering is to be understood as any densification, determined by diffusion processes, of bodies produced by powder technology, without or with the application of pressure and with no limitation to certain atmospheres or a vacuum.

According to the invention, infrared wavelength range is to be understood as a wavelength range in the lower to middle infrared wavelength range, such as between approx. 800 nm and 6000 nm. According to the invention, visible wavelength range is to be understood as a wavelength range from approx. 350 nm to 750 nm.

As a rule, several of the additives according to the invention of calcium, strontium and barium can also be contained together in the spinel ceramics. However, in order to prevent, to the greatest possible extent, transmission-reducing foreign phase precipitations and the formation of visible defects in the volume of the spinel ceramics transparent in wavelength ranges of infrared light according to the invention or to limit these defects to a minimum, an upper limit of the sum of all additives of 0.5 mass %, advantageously of 0.3 mass %, overall must be considered. In order to prevent, to the greatest possible extent, transmission-reducing foreign phase precipitations and the formation of visible defects also in the volume of the spinel ceramics transparent in wavelength ranges of visible light according to the invention or to limit these defects to a minimum, an upper limit of the sum of all additives of 0.3 mass %, advantageously of 0.2 mass %, overall must be considered.

For physical reasons, the spinel ceramics transparent in wavelength ranges of visible light according to the invention also satisfy the transparency criteria of the spinel ceramics transparent in wavelength ranges of infrared light according to the invention. However, the spinel ceramics transparent in wavelength ranges of infrared light can only satisfy the transparency criteria of the spinel ceramics transparent in wavelength ranges of visible light if the criteria of the proportions of additives for the spinel ceramics transparent in the wavelength ranges of visible light are met.

For the sake of avoiding or minimizing potential liquid phase formations, the spinel ceramics according to the invention advantageously do not contain any other additives or dopings of elements outside of the group of the alkaline earth elements. Naturally. raw material-related and processing-related impurities in the amount of up to approx. 0.1 mass % can often not be avoided and may be contained in the spinel ceramics according to the invention.

If, for example, compacts doped in this manner and made of spinel powders having approx. 30 m$^2$/g of specific surface area were produced, the sintering temperature is only changed insignificantly over a spinel ceramic according to the prior art by means of additives according to the invention based on Sr compounds or Ba compounds with an unchanged processing of the powder, a pressureless sintering up to relative densities around 96%-98% of the theoretical density with closed porosity, and subsequent hot isostatic end compression (HIP); the sintering temperature is, however, decreased by approx. 50° C.-100° C. for a spinel ceramic according to the invention that is doped with ≤0.2 mass % CaO. Even though the necessary sintering temperature may even be increased slightly with an additive containing Sr or Ba of the spinel ceramic according to the invention (approx. 1525° C. versus 1510° C. with undoped spinel ceramic), at least two surprising effects are also present in the case of these additives: The average structural grain sizes of all spinel ceramics doped according to the invention (calculated as 1.56 times the average fiber length of a typical intercepted-segment analysis) are typically <10 μm, preferably between 0.3 μm and 1.0 μm, often in the more narrow range of 0.4 μm to 0.7 μm. Together with the virtually full densification of the transparent spinel ceramics, these fine-crystalline structures lead to higher hardnesses, which are, measured as an HV10 Vickers hardness between 12.5 GPA and 15 GPa (at a 10-kg or 98-N test load of the indenter), for example, often 14 GPA to 14.5 GPa. Similar average structural grain sizes and hardnesses can also be achieved by means of the high Ca doping known since Bratton 1974, but are then accompanied by the aforementioned low RIT values and a whitish haze of thicker components caused by light scattering (for example, the haze determined according to DIN5036-1 of a ceramic of this type is generally >3% at a 4-mm thickness). The dopings according to the invention avoid this disadvantage and combine a real in-line transmission RIT>80% for wavelengths in the range between 600 nm and 650 nm at a thickness of polished samples>3 mm with a particularly low content of visible defects>20 μm of <300/cm$^3$. These defects are mainly smaller, incompletely sintered structural regions. Depending on the type and amount of the doping, the frequency of these defects often lies in the range of 50/cm$^3$-150/cm$^3$, but in every case below 300/cm$^3$, compared to a considerably higher frequency in an undoped spinel ceramic according to the prior art made of the same raw material with similar processing.

Concentrations of additives which are higher than the concentrations according to the invention are to be avoided, as they lead to light-scattering precipitations of foreign phases in the spinel structure which subsequently reduce the in-line transmission and may also form visible defects. On the other hand, concentrations of additives above the lower limit according to the invention are necessary for a significant effect of the additives.

The additives according to the invention can be added to the spinel powder both as the oxides CaO, SrO, and/or BaO and also in the form of other compounds containing Ca, Sr, and/or Ba, that is, also as carbonates, nitrates or other compounds. In each case, the observance of the concentrations expressed according to the invention as an oxide is thereby important on the one hand, as well as a suitable spatial homogenization of the additives with the spinel powder. This homogenization can, for example, occur by means of a combined, particularly thorough dispersion milling of the spinel powder with the additive in a ball mill, as has been known for decades for the homogenization of MgO dopings in Al$_2$O$_3$ ceramics, among other things. On the one hand, this homogenization step secures the uniform presence and sinter-promoting effect of the doping at a microscopic level throughout the sintered body and, on the other hand, prevents the formation of light-scattering foreign phase precipitations, as they could be produced by a local agglomeration of the additives.

The particular advantage of the solution according to the invention over the prior art is that actual specifications of additives are made in terms of type and quantity and, in particular, with respect to the total amount in connection with an upper limit for the average structural grain size, which additives are added exclusively to magnesium aluminum spinel powders and, pursuant to the production according to the invention, lead to spinel ceramics that have very specific and very high transmission values in different wavelength ranges and have no visible defects or only have defects at a low frequency.

The invention is explained below in greater detail with the aid of several exemplary embodiments.

EXAMPLE 1

0.1 mass % CaO powder (Merck) was added to an MgAl$_2$O$_4$ suspension of 29.8 mass % spinel powder (S30CR, Baikowski), 69.6 mass % deionized water and 0.6 mass % Dolapix CE64 dispersion aid (Zschimmer & Schwarz) dissolved therein after a two-hour deagglomeration milling in the laboratory attritor.

After the addition of 0.6 mass % polyvinyl alcohol (Mowiol 4-88, Zschimmer & Schwarz) and 2.0 mass % glycerol, in relation to the mass of spinel powder, as well as intensive homogenization by means of an agitator, the drying of the suspension occurred.

The dried and screen-granulated packing powder was pre-pressed to form circular disks with a 30-mm diameter and a 9-mm thickness for the purpose of shaping and was subsequently re-pressed in a cold isostatic process (CIP). After a two-hour thermal debinding in air at 800° C., the compacts were sintered in air at 1450° C. for two hours and then subsequently post-pressed in an argon atmosphere at 1420° C. for 15 hours in a hot isostatic process (HIP) to achieve the transparency. The specification of the temperatures occurred specifically for this packing powder as the result of a separate optimization of the heat treatment processes. Different temperatures are required for packings doped in a different manner.

The density of the resulting transparent disks was >99.9% of the theoretical density. The average structural grain size (calculated as 1.56 times the measured average fiber length) was 0.68 μm.

The HV10 Vickers macrohardness measured on a ceramographically prepared ground section was HV10=14.0 GPa.

The disks were ground in a plane-parallel manner to thicknesses of 3 mm and 5 mm and polished on both sides to a surface roughness $R_z$<0.03 μm.

The real in-line transmission (RIT; Gigahertz LCRT-2005-S spectrophotometer) measured on these disks at a 640-nm wavelength was 84.7% for 3-mm thick discs and 84.5% for 5-mm thick disks.

The in-line transmission measured on these disks by means of a spectrometer of the type Spectrum 400 (Perkin-Elmer, Waltham, Mass., USA) at a 2000-nm wavelength was 89% for 5-mm thick disks and thus achieves the theoretical transmission to be expected for this wavelength within the scope of measurement accuracy.

For the characterization of the visible defect population above a size of 20 μm, a sample section 12 mm×12 mm large was recorded using a high-resolution scanner. The visible defects were counted on a graphic image of this section that was enlarged by a factor of 20. Here, a defect concentration of 246/cm$^3$ was determined.

EXAMPLE 2

50 ml of an aqueous strontium nitrate solution was added to an $MgAl_2O_4$ suspension of 29.8 mass % spinel powder (S30CR, Baikowski), 69.6 mass % deionized water and 0.6 mass % Dolapix CE64 (Zschimmer & Schwarz) dispersion aid dissolved therein after a two-hour deagglomeration milling in the laboratory attritor. The concentration of this doping solution was selected such that the content of strontium oxide SrO in relation to the mass of the spinel powder was 0.125 mass %.

After the addition of 0.6 mass % polyvinyl alcohol (Mowiol 4-88, Zschimmer & Schwarz) and 2.0 mass % glycerol, in relation to the mass of spinel powder, as well as intensive homogenization by means of an agitator, the drying of the suspension occurred.

The dried and screen-granulated packing powder was pre-pressed to form circular disks with a 30-mm diameter and a 9-mm thickness for the purpose of shaping and subsequently re-pressed in a cold isostatic process (CIP). After a two-hour thermal debinding in air at 800° C., the compact was sintered in air at 1525° C. for two hours and then subsequently post-pressed in an argon atmosphere at 1530° C. for 15 hours in a hot isostatic process (HIP) to achieve the transparency.

The density of the resulting transparent disk was >99.9% of the theoretical density. The average structural grain size (calculated as 1.56 times the measured average fiber length) was 0.61 μm.

The HV10 Vickers macrohardness measured on a ceramographically prepared ground section was HV10=14.0 GPa.

The disk was ground in a plane-parallel manner to a thickness of 4 mm and polished on both sides to a surface roughness $R_z$<0.03 μm. The real in-line transmission (RIT) measured on this disk at a 640-nm wavelength was 85.3%. The measurement occurred using the Gigahertz LCRT-2005-S spectrophotometer.

By means of a Varian Cary 4000 spectrometer (Varian Inc. Mulgrave, Vic. Australia), the value of the total forward transmission was measured at TFT=86.4% at a 640-nm wavelength. The value for the haze determined according to ASTM D 1003-00 from the respective total transmission data and in-line transmission data (difference between TFT and RIT, divided by TFT, multiplied by 100) was 1.3%.

The in-line transmission of the same disk measured in the infrared wavelength range at 2000 nm by means of a spectrometer of the type Spectrum 400 (Perkin-Elmer, Waltham, Mass., USA) was 86.3%.

For the characterization of the visible defect population above a size of 20 μm, a sample section 12 mm×12 mm large was recorded using a high-resolution scanner. The visible defects were counted on a graphic image of this section that was enlarged by a factor of 20. Here, a defect concentration of 111/cm$^3$ was determined.

EXAMPLE 3

50 ml of an aqueous strontium nitrate solution was added to an $MgAl_2O_4$ suspension of 29.8 mass % spinel powder (S30CR, Baikowski), 69.6 mass % deionized water and 0.6 mass % Dolapix CE64 (Zschimmer & Schwarz) dispersion aid dissolved therein after a two-hour deagglomeration milling in the laboratory attritor. The concentration of this doping solution was selected such that the content of strontium oxide SrO in relation to the mass of the spinel powder was 0.3125 mass %.

After the addition of 0.6 mass % polyvinyl alcohol (Mowiol 4-88, Zschimmer & Schwarz) and 2.0 mass % glycerol, in relation to the mass of spinel powder, as well as intensive homogenization by means of an agitator, the drying of the suspension occurred.

The dried and screen-granulated packing powder was pre-pressed to form circular disks with a 30-mm diameter and a 9-mm thickness for the purpose of shaping and subsequently re-pressed in a cold isostatic process (CIP). After a two-hour thermal debinding in air at 800° C., the compact was sintered in air at 1470° C. for two hours and then subsequently post-pressed in an argon atmosphere at 1470° C. for 15 hours in a hot isostatic process (HIP) to achieve the transparency.

The density of the resulting transparent disks was >99.9% of the theoretical density. The average structural grain size (calculated as 1.56 times the measured average fiber length) was 0.36 μm.

The HV10 Vickers macrohardness measured on ceramographically prepared ground sections was HV10=14.3 GPa.

The disks were ground in a plane-parallel manner to thicknesses of 4 mm and polished on both sides to a surface roughness $R_z$<0.03 μm. The real in-line transmission measured on this disk at a 2000-nm wavelength by means of a spectrometer of the type Spectrum 400 (Perkin-Elmer, Waltham, Mass., USA) was 86.6%.

For the characterization of the visible defect population above a size of 20 μm, a sample section 12 mm×12 mm large was recorded using a high-resolution scanner. The visible defects were counted on a graphic image of this section that was enlarged by a factor of 20. Here, a defect concentration of 85/cm$^3$ was deter mined.

EXAMPLE 4

50 ml of an aqueous barium nitrate solution was added to an $MgAl_2O_4$ suspension of 29.8 mass % spinel powder (S30CR, Baikowski), 69.6 mass % deionized water and 0.6 mass % Dolapix CE64 (Zschimmer & Schwarz) dispersion aid dissolved therein after a two-hour deagglomeration milling in the laboratory attritor. The concentration of this doping solution was selected such that the content of barium oxide BaO in relation to the mass of the spinel powder was 0.125 mass %.

After the addition of 0.6 mass % polyvinyl alcohol (Mowiol 4-88, Zschimmer & Schwarz) and 2.0 mass % glycerol, in relation to the mass of spinel powder, as well as intensive homogenization by means of an agitator, the drying of the suspension occurred.

The dried and screen-granulated packing powder was pre-pressed to form circular disks with a 30-mm diameter and a 9-mm thickness for the purpose of shaping and subsequently re-pressed in a cold isostatic process (CIP). After a two-hour thermal debinding in air at 800° C., the compact was sintered in air at 1520° C. for two hours and then subsequently post-pressed in an argon atmosphere at 1520° C. for 15 hours in a hot isostatic process (HIP) to achieve the transparency.

The density of the resulting transparent disks was >99.9% of the theoretical density. The average structural grain size (calculated as 1.56 times the measured average fiber length) was 0.59 μm.

The HV10 Vickers macrohardness measured on ceramographically prepared ground sections was HV10=14.1 GPa.

The disks were ground in a plane-parallel manner to thicknesses of 4 mm and polished on both sides to a surface roughness $R_z$<0.03 μm. The real in-line transmission (RIT) measured on these disks at a 640-nm wavelength was 84.5%. The measurement occurred respectively using the Gigahertz LCRT-2005-S spectrophotometer.

By means of a Varian Cary 4000 spectrometer (Varian Inc. Mulgrave, Vic., Australia), the value of the total forward transmission was measured at TFT=85.5% at a 640-nm wavelength. The value for the haze determined according to ASTM D 1003-00 from the respective total transmission data and in-line transmission data (difference between TFT and RIT, divided by TFT, multiplied by 100) was 1.5%.

The in-line transmission of the same disk measured in the infrared wavelength range at 2000 nm by means of a spectrometer of the type Spectrum 400 (Perkin-Elmer, Waltham, Mass., USA) was 86.8%

For the characterization of the visible defect population above a size of 20 μm, a sample section 12 mm×12 mm large was recorded using a high-resolution scanner. The visible defects were counted on a graphic image of this section that was enlarged by a factor of 20. Here, a defect concentration of 116/cm$^3$ was determined.

EXAMPLE 5

50 ml of an aqueous barium nitrate solution was added to an $MgAl_2O_4$ suspension of 29.8 mass % spinel powder (S30CR, Baikowski), 69.6 mass % deionized water and 0.6 mass Dolapix CE64 (Zschimmer & Schwarz) dispersion aid dissolved therein after a two-hour deagglomeration milling in the laboratory attritor. The concentration of this doping solution was selected such that the content of barium oxide BaO in relation to the mass of the spinel powder was 0.3125 mass %.

After the addition of 0.6 mass % polyvinyl alcohol (Mowiol 4-88, Zschimmer & Schwarz) and 2.0 mass % glycerol, in relation to the mass of spinel powder, as well as intensive homogenization by means of an agitator, the drying of the suspension occurred.

The dried and screen-granulated packing powder was pre-pressed to form circular disks with a 30-mm diameter and a 9-mm thickness for the purpose of shaping and subsequently re-pressed in a cold isostatic process (CIP). After a two-hour thermal debinding in air at 800° C., the compact was sintered in air at 1490° C. for two hours and then subsequently post-pressed in an argon atmosphere at 1490° C. for 15 hours in a hot isostatic process (HIP) to achieve the transparency.

The density of the resulting transparent disks was >99.9% of the theoretical density. The average structural grain size (calculated as 1.56 times the measured average fiber length) was 0.38 μm.

The HV10 Vickers macrohardness measured on ceramographically prepared ground sections was HV10=14.3 GPa.

The disks were ground in a plane-parallel manner to thicknesses of 4 mm and polished on both sides to a surface roughness $R_z$<0.03 μm. The real in-line transmission measured on this disk at a 2000-nm wavelength by means of a spectrometer of the type Spectrum 400 (Perkin-Elmer, Waltham, Mass., USA) was 86.7%.

For the characterization of the visible defect population above a size of 20 μm, a sample section 12 mm×12 mm large was recorded using a high-resolution scanner. The visible defects were counted on a graphic image of this section that was enlarged by a factor of 20. Here, a defect concentration of 61/cm$^3$ was determined.

The invention claimed is:

1. Spinel ceramics which are transparent in wavelength ranges of infrared light, composed of sintered magnesium aluminum spinel having an average structural grain size of ≤10 μm and having maximally 0.5 mass % overall of homogeneously distributed additives of calcium and/or strontium and/or barium which are present in a concentration, expressed respectively as an oxide, of 0.005 to <0.2 mass % CaO and/or 0.005 to <0.5 mass % SrO and/or 0.005 to <0.5 mass % BaO.

2. Spinel ceramics which are transparent in wavelength ranges of visible light, composed of sintered magnesium aluminum spinel having an average structural grain size of ≤10 μm and having maximally 0.3 mass % overall of homogeneously distributed additives of calcium and/or strontium and/or barium which are present in a concentration, expressed respectively as an oxide, of 0.005 to <0.2 mass % CaO and/or 0.005 to <0.3 mass % SrO and/or 0.005 to <0.25 mass % BaO.

3. Transparent spinel ceramics according to claim 1 in which the average structural grain size of the sintered magnesium aluminum spinel is <5 μm.

4. Transparent spinel ceramics according to claim 1 in which maximally 0.3 mass % overall of homogeneously distributed additives are present.

5. Transparent spinel ceramics according to claim 2 in which maximally 0.2 mass % overall of homogeneously distributed additives are present.

6. Transparent spinel ceramics according to claim 1 in which calcium is present as an additive in a concentration, expressed as CaO, of 0.01 to 0.1 mass %.

7. Transparent spinel ceramics according to claim 1 in which strontium and/or barium are present as additives in a concentration, expressed as SrO and/or BaO, of 0.01 to 0.4 mass % of SrO and/or 0.01 to 0.4 mass % of BaO, wherein maximally 0.3 mass % of additives of strontium and/or barium are present.

8. Transparent spinel ceramics according to claim 2 in which strontium and/or barium are present as additives in a concentration, expressed as SrO and/or BaO, of 0.01 to 0.2 mass % of SrO and/or 0.01 to 0.15 mass % of BaO, wherein maximally 0.2 mass % of additives of strontium and/or barium are present.

9. Transparent spinel ceramics according to claim 1 which show an in-line transmission of >82%, at least in the range of infrared wavelengths, measured between 1000 nm and 2500 nm, at thicknesses of ≥3 mm.

10. Transparent spinel ceramics according to claim 2 which show an RIT of >80%, at least in the range of infrared visible wavelengths, measured between 600 nm and 650 nm, at thicknesses of ≥3 mm.

11. Transparent spinel ceramics according to claim 1 which contain no visible defects.

12. Transparent spinel ceramics according to claim 1 which contain visible defects of greater than 20 μm at a frequency of <300/cm$^3$.

13. Transparent spinel ceramics according to claim 12 which contain visible defects greater than 20 μm at a frequency of 50/cm$^3$ to 150/cm$^3$.

14. Transparent spinel ceramics according to claim 1 in which HV10 Vickers hardnesses of ≥12.5 GPa are present.

15. Method for producing transparent spinel ceramics according to claim 1 in which the addition of maximally 0.5 mass % overall of additives of calcium and/or strontium and/or barium in a concentration, expressed respectively as an oxide, of 0.005 to <0.2 mass % CaO and/or 0.005 to <0.5 mass % SrO and/or 0.005 to <0.5 mass % BaO in the form of undissolved compounds containing Ca, Sr and/or Ba and/or compounds containing Ca, Sr and/or Ba dissolved in water and/or compounds containing Ca, Sr and/or Ba dissolved in organic solvents to magnesium aluminum spinel powder is carried out, the additives are homogeneously distributed, and the materials are subsequently sintered to form a transparent spinel ceramic.

16. Method for producing transparent spinel ceramics according to claim 2 in which the addition of maximally 0.3 mass % overall of additives of calcium and/or strontium and/or barium in a concentration, expressed respectively as an oxide, of 0.005 to <0.2 mass % CaO and/or 0.005 to <0.3 mass % SrO and/or 0.005 to <0.25 mass % BaO in the form of undissolved compounds containing Ca, Sr and/or Ba and/or compounds containing Ca, Sr and/or Ba dissolved in water and/or compounds containing Ca, Sr and/or Ba dissolved in organic solvents to magnesium aluminum spinel powder is carried out, the additives are distributed homogeneously, and the materials are subsequently sintered to form a transparent spinel ceramic.

17. Method according to claim 15 in which the addition of the additives is carried out during the slurry preparation or packing preparation of the ceramic, or as part of an impregnation or infiltration of the additives into open pores of a dry ceramic body, or is realized by ion exchange between wet magnesium aluminum spinel bodies and solutions according to the invention containing Ca, Sr and/or Ba.

18. Transparent spinel ceramics according to claim 2 in which the average structural grain size of the sintered magnesium aluminum spinel is <5 μm, advantageously <2.5 μm, more advantageously <1 μm.

19. Transparent spinel ceramics according to claim 2 in which calcium is present as an additive in a concentration, expressed as CaO, of 0.01 to 0.1 mass %.

20. Transparent spinel ceramics according to claim 2 which contain no visible defects.

21. Spinel ceramics which are transparent in wavelength ranges of infrared light, composed of sintered magnesium aluminum spinel having an average structural grain size of ≤10 μm and having maximally 0.5 mass % overall of homogeneously distributed additives of calcium and/or strontium and/or barium which are present in a concentration, expressed respectively as an oxide, of 0.005 to <0.2 mass % CaO and/or 0.005 to <0.5 mass % SrO and/or 0.005 to <0.5 mass % BaO, and contain a non-zero amount of visible defects of greater than 20 μm at a frequency of <300/cm$^3$.

22. Spinel ceramics which are transparent in wavelength ranges of visible light, composed of sintered magnesium aluminum spinel having an average structural grain size of ≤10 μm and having maximally 0.3 mass % overall of homogeneously distributed additives of calcium and/or strontium and/or barium which are present in a concentration, expressed respectively as an oxide, of 0.005 to <0.2 mass % CaO and/or 0.005 to <0.3 mass % SrO and/or 0.005 to <0.25 mass % BaO, and contain a non-zero amount of visible defects of greater than 20 μm at a frequency of <300/cm$^3$.

23. Transparent spinel ceramics according to claim 2 which contain visible defects of greater than 20 μm at a frequency of <300/cm$^3$.

24. Transparent spinel ceramics according to claim 23 which contain visible defects greater than 20 μm at a frequency of 50/cm$^3$ to 150/cm$^3$.

25. Transparent spinel ceramics according to claim 2 in which HV10 Vickers hardnesses of ≥12.5 GPa are present.

26. Method according to claim 16 in which the addition of the additives is carried out during the slurry preparation or packing preparation of the ceramic, or as part of an impregnation or infiltration of the additives into open pores of a dry ceramic body, or is realized by ion exchange between wet magnesium aluminum spinel bodies and solutions according to the invention containing Ca, Sr and/or Ba.

27. Transparent spinel ceramics according to claim 1 in which the average structural grain size of the sintered magnesium aluminum spinel is <2.5 μm.

28. Transparent spinel ceramics according to claim 1 in which the average structural grain size of the sintered magnesium aluminum spinel is <1 μm.

29. Transparent spinel ceramics according to claim 1 which show an in-line transmission of >82%, at least in the range of infrared wavelengths, measured between 1000 nm and 2500 nm, at thicknesses of ≥3 mm.

30. Transparent spinel ceramics according to claim 1 which show an in-line transmission of >84%, at least in the range of infrared wavelengths, measured between 1000 nm and 2500 nm, at thicknesses of ≥3 mm.

31. Transparent spinel ceramics according to claim 2 which show an RIT of >82%, at least in the range of infrared visible wavelengths, measured between 600 nm and 650 nm, at thicknesses of ≥3 mm.

32. Transparent spinel ceramics according to claim 2 which show an RIT of >84%, at least in the range of infrared visible wavelengths, measured between 600 nm and 650 nm, at thicknesses of ≥3 mm.

* * * * *